United States Patent
Maher et al.

(10) Patent No.: US 11,606,773 B1
(45) Date of Patent: Mar. 14, 2023

(54) SYSTEMS AND METHODS FOR AUTONOMOUS SPATIAL AND BEAM CONFIGURATION OF ANTENNA APPARATUS

(71) Applicant: Verizon Patent and Licensing Inc., Basking Ridge, NJ (US)

(72) Inventors: Dana Maher, Portland, OR (US); David A. Newell, Justin, TX (US); X, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/478,422

(22) Filed: Sep. 17, 2021

(51) Int. Cl.
  *H04W 64/00* (2009.01)
  *H04B 7/06* (2006.01)
  *H04B 7/26* (2006.01)

(52) U.S. Cl.
  CPC ........ *H04W 64/006* (2013.01); *H04B 7/0617* (2013.01); *H04B 7/26* (2013.01)

(58) Field of Classification Search
  CPC ..... H04W 4/025; H04W 4/029; H04W 48/04; H04W 48/06; H04W 64/00; H04W 64/003; H04W 64/006; H04B 7/0617; H04B 7/26
  See application file for complete search history.

(56) References Cited

U.S. PATENT DOCUMENTS

| | | | |
|---|---|---|---|
| 7,206,294 B2* | 4/2007 | Garahi | H04W 88/02 455/11.1 |
| 2006/0002326 A1* | 1/2006 | Vesuna | H04W 16/18 370/328 |
| 2017/0171834 A1* | 6/2017 | Neves | H01Q 1/52 |
| 2021/0314908 A1* | 10/2021 | Gonzalez Escudero | H04W 64/006 |
| 2022/0060906 A1* | 2/2022 | Goto | H04W 16/18 |

OTHER PUBLICATIONS

NPL (WO2021/231429 A1 by Yubong Jian, filed on May 11, 2021 and claiming priority to U.S. Appl. No. 63/022,656, filed May 11, 2020) (Year: 2021).*
NPL (WO/2021/040586 A1) discloses position estimation for emitters outside line of sight of fixed network nodes. (Year: 2021).*

\* cited by examiner

*Primary Examiner* — Siu M Lee

(57) ABSTRACT

A system described herein may provide a technique for the generation of one or more models indicating positions and/or attributes of objects within an environment, such as a warehouse, a facility, a data center, etc. The models may be generated by measuring radio frequency ("RF") metrics or other metrics within the environment over time. The environment may include mobile antenna apparatuses providing wireless coverage to wireless devices within the environment. The mobile antenna apparatuses may be moved within the environment based on the positions of objects within the environment (e.g., as indicated by the one or more models) and the positions of one or more wireless devices that connect to one or more of the mobile antenna apparatuses.

20 Claims, 12 Drawing Sheets

US 11,606,773 B1

SYSTEMS AND METHODS FOR AUTONOMOUS SPATIAL AND BEAM CONFIGURATION OF ANTENNA APPARATUS

BACKGROUND

Wireless user equipment ("UE"), such as mobile telephones or other wireless communication devices, may communicate with networks via wireless communications. For example, UEs may connect to a base station, a wireless access point, or some other type of radio equipment. Objects in between such radio equipment and a UE may cause signal quality or other characteristics of wireless communications between the radio equipment and the UE to be degraded, thus resulting in high latency, lost traffic, or a loss of connection entirely.

DETAILED DESCRIPTION OF EXAMPLE EMBODIMENTS

The following detailed description refers to the accompanying drawings. The same reference numbers in different drawings may identify the same or similar elements.

Embodiments described herein provide for the automated positioning (e.g., in three-dimensional space) and/or tilt (e.g., yaw, pitch, and roll) of radio frequency ("RF") equipment in order to maximize signal quality and/or other RF metrics for User Equipment ("UEs") that connect to the RF equipment. The automated positioning and/or tilt may be performed based on locations or movements of the UEs within an environment, such as a warehouse, a room, a facility, etc. in which the RF equipment is located and/or to which such RF equipment provides wireless coverage. As discussed below, the automated positioning and/or tilt may be performed in a manner that accounts for, and compensates for, obstructions within the environment that may impact such wireless coverage. Such obstructions may include objects within the environment, features of the environment (e.g., walls, platforms, shelves, or the like), or other types of obstructions. For example, in some embodiments, the RF equipment may be moved along a set of tracks, may be affixed to a drone or other moveable apparatus, or may otherwise be moved or repositioned to locations within the environment at which the RF equipment may provide wireless coverage to one or more UEs within the environment with at least a threshold level of signal quality or other RF metrics.

In some embodiments, a map, a model, or some other representation of a layout of the environment and/or of obstructions within the environment may be generated and used when determining when and where to reposition RF equipment providing wireless coverage to UEs within the environment. In some embodiments, such map, model, etc. may be automatically generated by determining RF signal quality metrics associated with communications between RF equipment and UEs in the environment. Such signal quality metrics may vary based on varying locations of the RF equipment and UEs within the environment, such that certain patterns in RF metrics collected over time may be detected and used to identify locations within the environment that include, or are likely to include, obstructions affecting the quality of communications between the RF equipment and UEs in the environment. Additionally, or alternatively, in some embodiments, Light Detection and Ranging ("LIDAR"), image recognition, or other suitable techniques may be used to identify the presence of such obstructions.

Figure 1:
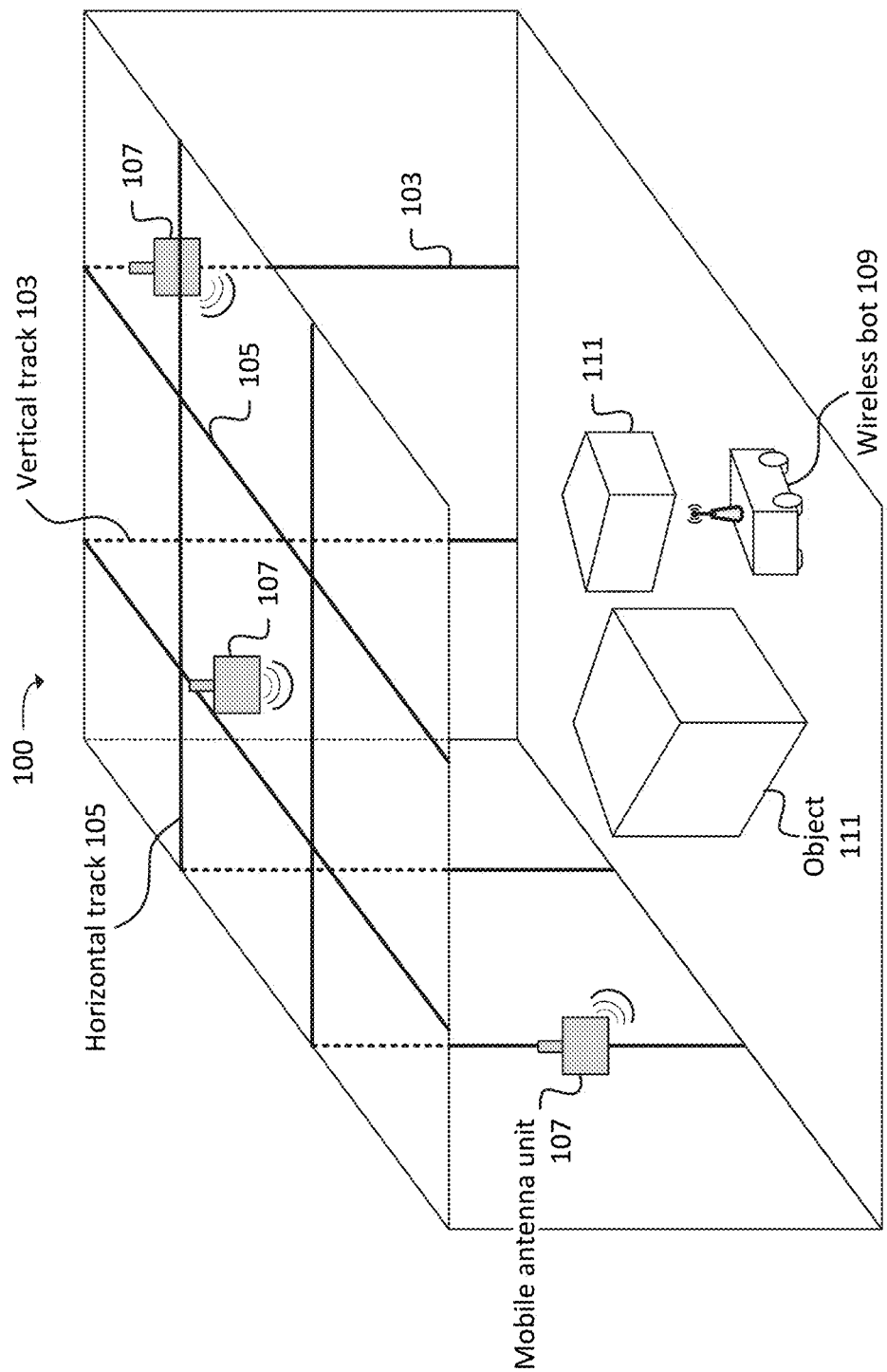
FIG. 1 illustrates an example environment in which one or more embodiments, described herein, may be implemented.

FIG. 1 depicts a cut-out oblique view of environment 100, which may be, may include, or may be a portion of a facility, a warehouse, a data center, a room, or other type of location or area. Environment 100 may include one or more physical boundaries, such as walls, ceilings, floors, etc. In this example, a floor, a ceiling, and two walls of environment 100 are depicted. In an example where environment 100 is a room within a facility, warehouse, a data center, etc., environment 100 may include additional walls that are not depicted in FIG. 1. Specifically, for example, two such walls are not depicted in FIG. 1 for the sake of clarity of the illustration.

Environment 100 may also include a set of tracks, such as one or more vertical tracks 103 that are situated on or affixed to one or more vertical surfaces (e.g., walls) of environment 100, and one or more horizontal tracks 105 that are situated on or affixed to one or more horizontal surfaces (e.g., a ceiling) of environment 100. In some embodiments, different arrangements of tracks may be provided, such as additional or fewer tracks, and/or tracks that are affixed to diagonal surfaces such as roof lines other types of surfaces of environment 100 may be provided.

As further shown, one or more mobile antenna units ("MAUs") 107 may be mounted, affixed, etc. to one or more vertical tracks 103 and/or horizontal tracks 105 (referred to sometimes herein as "tracks 103/105"). For example, MAUs 107 may be able to move along tracks 103/105 (e.g., along the same axis as tracks 103/105 run). For example, MAUs 107 may be able to move vertically along vertical tracks 103, and horizontally along horizontal tracks 105. MAUs 107 may further be able to move from a particular vertical track 103 to a particular horizontal track 105 (e.g., where such vertical track 103 and horizontal track 105 abut each other or are within a suitable proximity of each other). As such, a given MAU 107 may, in some embodiments, be able to positioned along any track 103/105 of environment 100. MAUs 107 may utilize any suitable type of mobility device or mechanism to travel along tracks 103/105, such as wheels, magnets, motors, or the like. As discussed below, MAUs 107 may be controlled by an MAU control system of some embodiments, which may issue commands, instructions, etc. to MAUs 107 to cause MAUs 107 to move (e.g., along tracks 103/105 or using some other suitable mobility mechanism) to different locations within environment 100. For example, as discussed above, in addition to or in lieu of tracks 103/105, MAUs 107 may be mounted, affixed, etc. to one or more drones (e.g., flying drones) or other types of mobility apparatus. In some embodiments, such drones or other mobility apparatus may receive instructions, commands, etc. from an MAU control system in order to move to particular locations within environment 100. As further discussed below, MAUs 107 may receive commands from the MAU control system relating to an angle at which MAUs 107 point (e.g., yaw, pitch, and/or roll commands) and/or beamforming parameters relating to beam strength, width, and/or azimuth angle of one or more beams associated with one or more antennas of respective MAUs 107.

MAUs 107 may include one or more antennas, radios, transceivers, etc. that send and/or receive wireless traffic. For example, MAUs 107 may be, may implement, or may include, one or more Wi-Fi access points (e.g., associated with an unlicensed radio access technology ("RAT")), femtocells (e.g., associated with or communicatively coupled to a radio access network ("RAN") of a licensed wireless network), picocells, or other types of RF equipment. In some embodiments, environment 100 may include or may be communicatively coupled to network equipment, such as routers, hubs, gateways, switches, etc., via which MAUs 107 may communicate with one or more networks, such as a RAN, a core of a wireless network, the Internet, or some other type of network. Thus, UEs or other types of wireless devices within environment 100 may receive network connectivity via one or more MAUs 107.

In some embodiments, one such type of UE may include, may be implemented by, and/or may be communicatively coupled to one or more wireless bots 109. In some embodiments, wireless bot 109 may include one or more radios, antennas, transceivers, etc. that are able to communicate with one or more MAUs 107. For example, wireless bot 109 may communicate (e.g., via MAUs 107) with a bot control system, which issues commands, instructions, or the like to wireless bot 109, based on which wireless bot 109 may move within environment 100. For example, wireless bot 109 may include wheels, treads, legs, arms, flying apparatus (e.g., propellers, wings, etc.), and/or other types of mobility apparatus that may give wireless bot 109 the ability to move (e.g., in two dimensions and/or in three dimensions) within environment 100.

In some embodiments, wireless bot 109 may include one or more sensors, such as an accelerometer, a motion sensor, a thermometer, a barometer, a LIDAR sensor, a camera, a microphone, a location determination component (e.g., a Global Positioning System ("GPS") component or other suitable location determination component), or other types of sensors that may measure or detect events associated with environment 100 or wireless bot 109, or attributes of environment 100 or wireless bot 109. In some embodiments, wireless bot 109 may communicate (e.g., via MAU 107) with the bot control system of some embodiments in order to provide sensor measurements, feedback, or other types of information to the bot control system, based on which the bot control system may provide updated instructions, commands, etc.

In some embodiments, wireless bot 109 be may or may include an autonomous or semi-autonomous machine that performs various functions within environment 100. As one example, wireless bot 109 may be configured to retrieve, move, or arrange items such as boxes, crates, pallets, etc. within environment 100. As such, wireless bot 109 may include one or more robotic arms, claws, and/or other types of apparatus that are suitable to carry out such functions. As another example, wireless bot 109 may be configured to perform surveillance or monitoring functions within environment 100, and may include one or more cameras, microphones, and/or other types of apparatus that are suitable to carry out such functions.

Environment 100 may also include one or more objects 111. As noted above, such objects 111 may include boxes, crates, pallets, shelves, walls, or other types of objects. In some situations, the presence of objects 111 may interfere with or otherwise degrade wireless communications between one or more MAUs 107 and one or more UEs within environment 100 (e.g., wireless bot 109 and/or one or more UEs associated with wireless bot 109). For example, one or more objects 111 may be within a "line of sight" between wireless bot 109 and a particular MAU 107 to which wireless bot 109 is connected, which may reduce signal quality of wireless signals between wireless bot 109 and MAU 107.

Figure 2A:
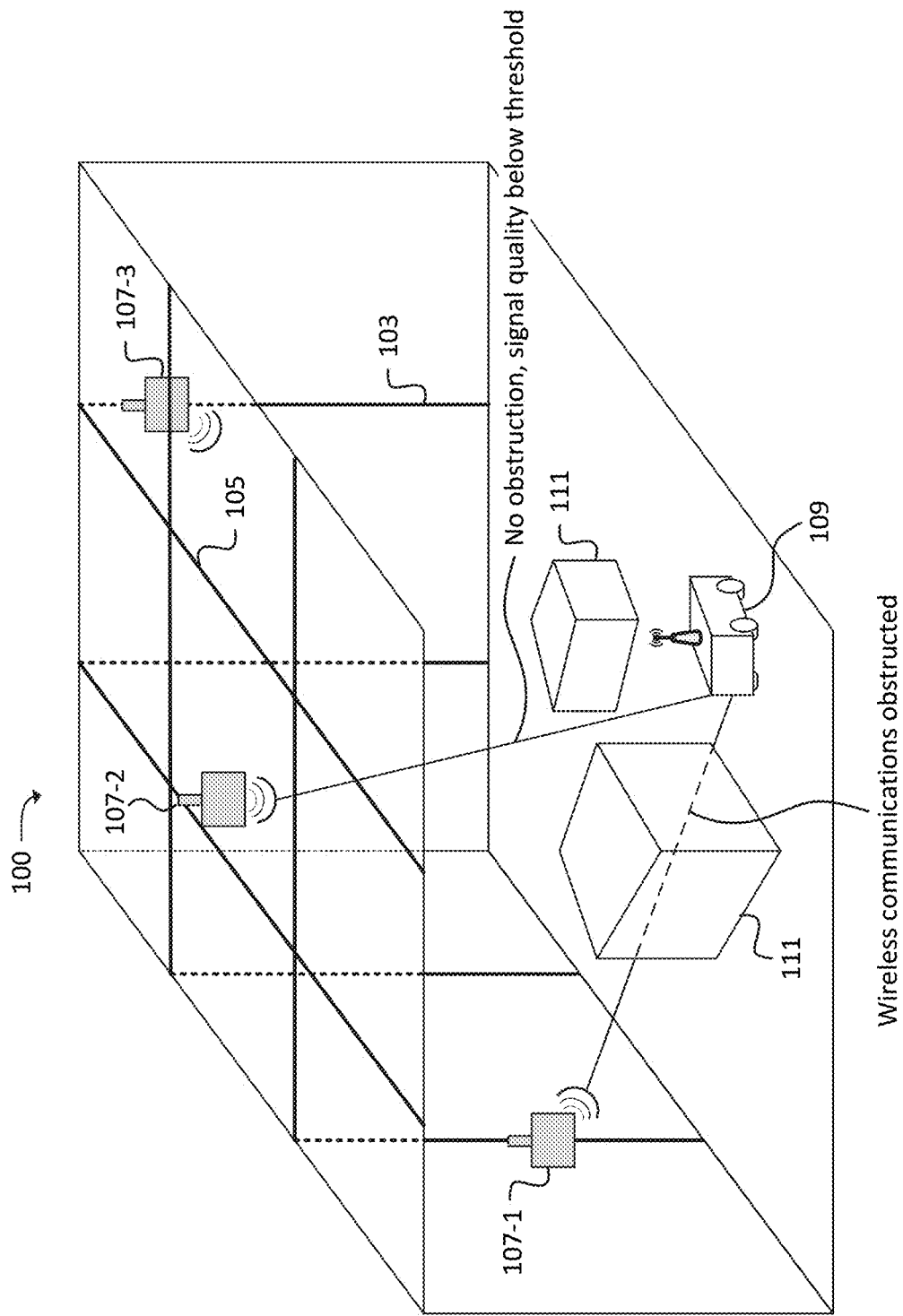
FIGS. 2A and 2B illustrate an example overview of one or more embodiments described herein.

For example, as shown in FIG. 2A, wireless bot 109 may be connected to a first MAU 107 (i.e., MAU 107-1, in this example). Based on the positioning of wireless bot 109 and MAU 107-1, one or more objects 111 may be situated in between wireless bot 109 and MAU 107-1. As such, wireless communications between wireless bot 109 and MAU 107-1 may be obstructed, interfered with, or otherwise degraded. For example, wireless bot 109 and/or MAU 107-1 may measure or determine RF metrics such as Signal-to-Interference-and-Noise-Ratio ("SINR"), Received Signal Strength Indicator ("RSSI"), Reference Signal Received Power ("RSRP"), Reference Signal Received Quality ("RSRQ"), Channel Quality Indicator ("CQI"), and/or other RF metrics associated with wireless communications between wireless bot 109 and MAU 107-1. Additionally, or alternatively, wireless bot 109 and/or MAU 107-1 may determine traffic metrics, such as throughput, latency, jitter, or the like associated with communications between wireless bot 109 and MAU 107-1. Such RF metrics, traffic metrics, or other indicators of signal quality may be below a threshold, which may be a result of the presence of one or more objects 111 situated between wireless bot 109 and MAU 107-1.

Further in this example, wireless bot 109 may be within communications range of another MAU 107 (i.e., MAU 107-2, in this example). No objects 111 may be situated between MAU 107-2 and wireless bot 109 in this example. However, signal quality (e.g., RF metrics, traffic metrics, or other suitable indicators of signal quality) may be below a threshold due to factors other than the presence of objects 111. For example, MAU 107-2 and wireless bot 109 may be located relatively far apart, one or more antennas or beams of MAU 107-2 may be pointed away from wireless bot 109, etc. Further, wireless bot 109 may be outside of a coverage area of a third MAU 107 (i.e., MAU 107-3, in this example), such that wireless bot 109 is not able to connect to MAU 107-3. Thus, in this example, wireless bot 109 may not receive suitable wireless service from any of the MAUs 107 associated with environment 100 in which wireless bot 109 is located.

Figure 2B:
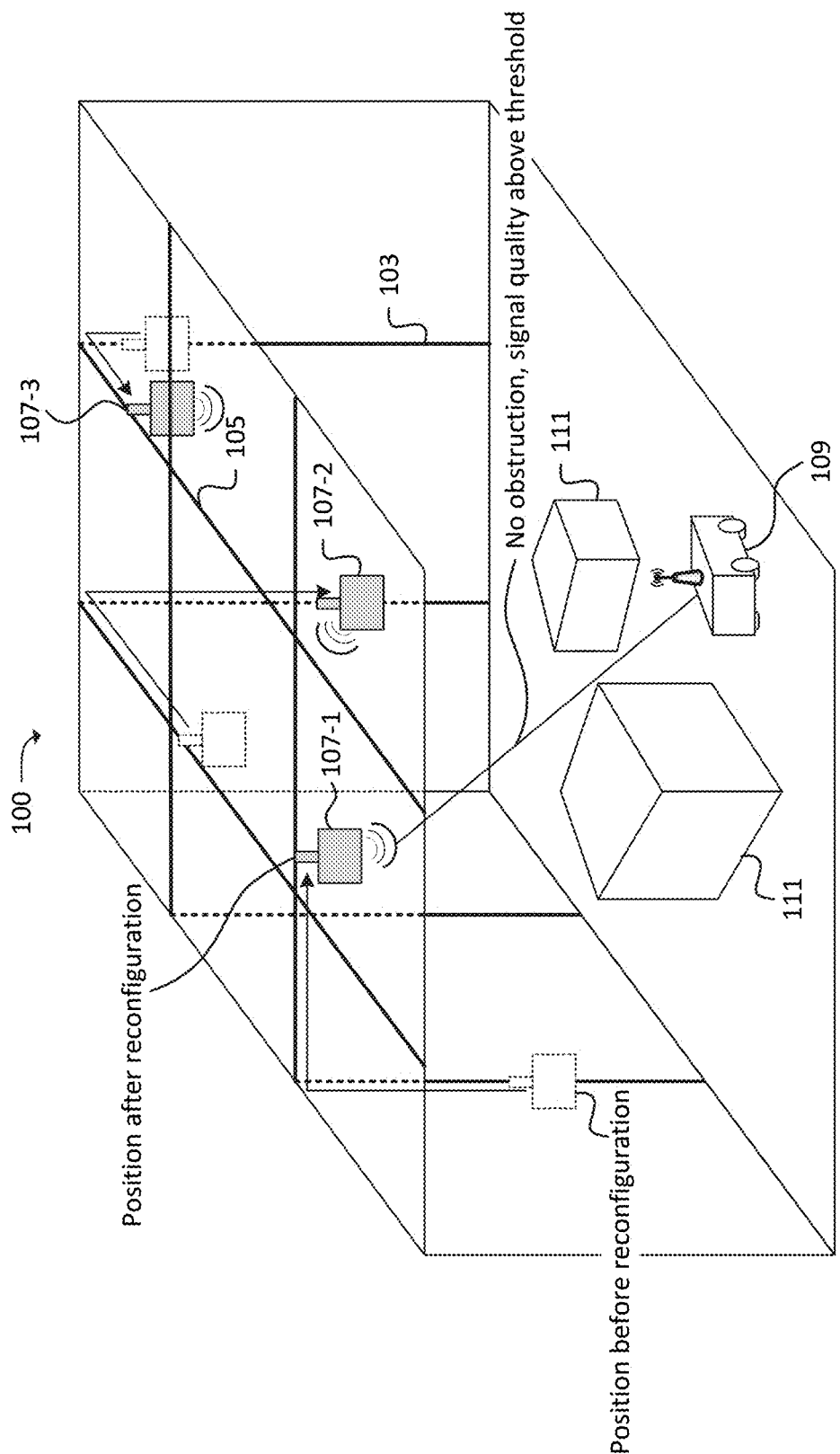

In accordance with some embodiments, and as described in further detail below, one or more MAUs 107 may move (e.g., along one or more tracks 103/105) based on locations of objects 111 within environment 100, and/or based on the location of wireless bot 109 within environment 100. For example, as shown in FIG. 2B, MAU 107-1 may move (e.g., along one or more tracks 103/105) to a location within environment 100 such that signal quality of communications between wireless bot 109 and MAU 107-1 is improved, compared to the signal quality of such communications based on the positioning of MAU 107-1 shown in FIG. 2A. For example, based on the change in position of MAU 107-1, wireless communications between MAU 107-1 and wireless bot 109 may no longer be obstructed by one or more objects 111. Further, signal quality of such communications between MAU 107-1 and wireless bot 109 may now be above a threshold level, thus alleviating or eliminating the degraded signal quality conditions resulting from the previous positioning of MAU 107-1 (e.g., relative to wireless bot 109) and/or resulting from the positioning of object 111 between MAU 107-1 and wireless bot 109.

As further shown, one or more other MAUs 107 (i.e., MAUs 107-2 and 107-3, in this example) may be moved based on the repositioning of MAU 107-1 and/or based on other factors. For example, the repositioning of MAU 107-1 may cause MAU 107-1 to be moved to a location that is relatively more proximate to MAU 107-2, which may result in overlapping coverage areas associated with wireless service provided by MAUs 107-1 and 107-2. Further, "dead zones" or areas with reduced or degraded wireless coverage may result from multiple MAUs 107 being located near each other while other areas within environment 100 do not have wireless coverage. Similarly, based on the repositioning of MAU 107-2, MAU 107-3 may be repositioned to avoid or minimize the creation of "dead zones" within environment 100.

As another example, one or more MAUs 107 may be repositioned based on the location of wireless bot 109 and/or other wireless bots 109 within environment 100. For example, if no wireless bots 109 are located within a particular region of environment 100, a "dead zone" within such region may be created (or may be allowed to be created), as wireless coverage within such regions may not be needed. In some embodiments, the actual or predicted movements of one or more wireless bots 109 may be used as a factor in determining when and where to move or reposition one or more MAUs 107. For example, wireless bots 109 may move based on a schedule and/or predetermined path, movements of wireless bots 109 may be predicted based on one or more predictive models (e.g., generated using artificial intelligence/machine learning ("AI/ML") techniques or other suitable techniques), and/or the movement of wireless bots 109 may otherwise be able to be determined. One or more MAUs 107 may thus be moved based on the movements of wireless bots 109 and/or based on the movements of each other, thus providing wireless coverage to wireless bots 109 within environment 100 as they move, while avoiding RF interference between MAUs 107 and/or minimizing "dead zones" within environment 100.

In some embodiments, other types of adjustments, in addition to or in lieu of the repositioning of one or more MAUs 107, may be made to improve the quality of communications between MAUs 107 and one or more wireless bots 109. For example, a tilt angle of one or more physical components of MAU 107 may be modified, such that a direction that one or more antennas, radios, etc. of MAU 107 face may be modified. That is, the coverage area associated with MAU 107 may be modified by changing a tilt angle, azimuth angle, etc. of one or more antennas, radios, etc. of MAU 107. In some embodiments, the coverage area of MAU 107 may be modified by modifying one or more beamforming parameters of MAU 107, which may include modifying an antenna gain, azimuth angle, etc. of one or more antennas, radios, etc. of MAU 107.

Figure 3:
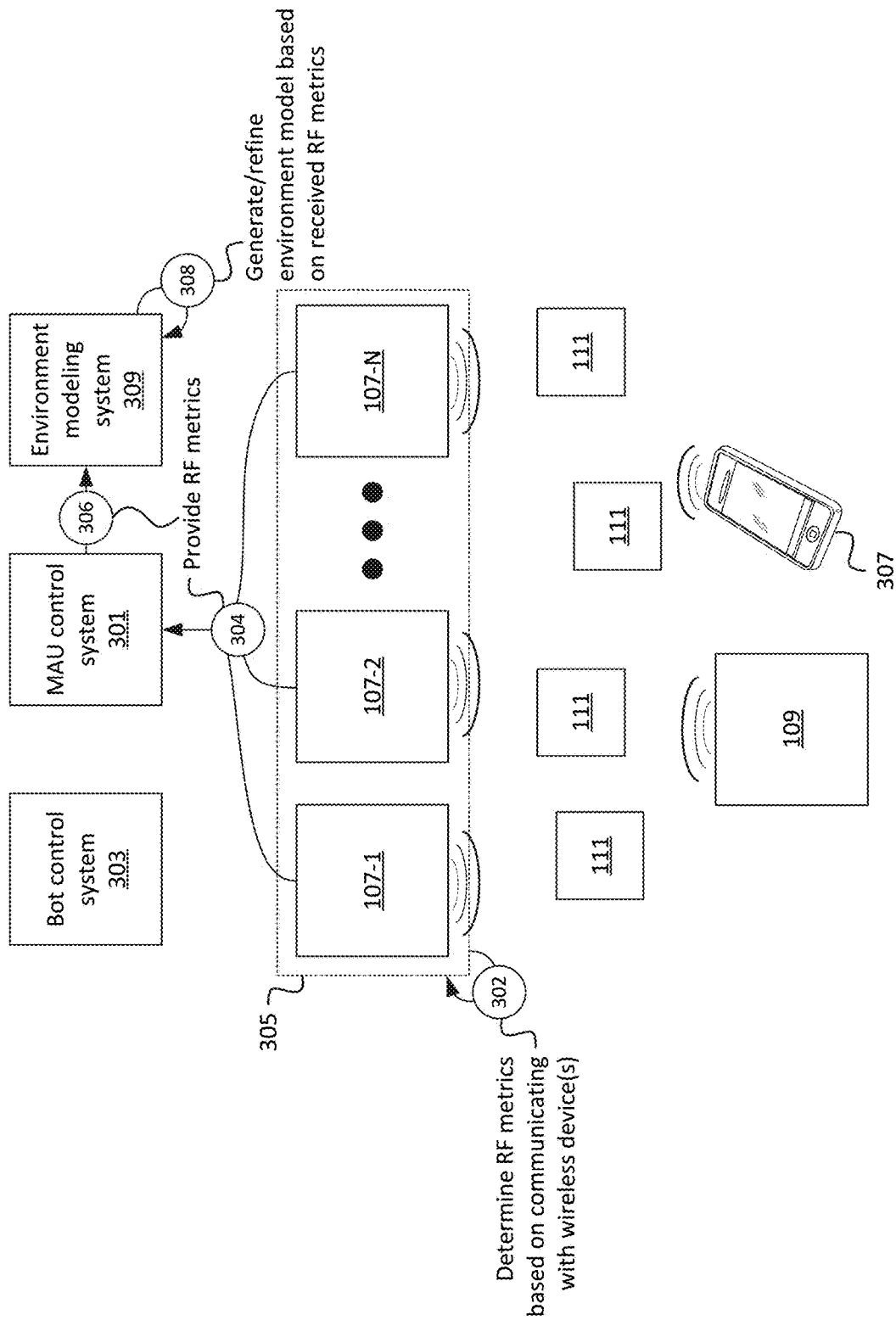
FIGS. 3 and 4 illustrate an example of environment model generation associated with a particular environment, in accordance with some embodiments.

As noted above, MAUs 107 and/or wireless bots 109 may be controlled by one or more control systems. For example, as shown in FIG. 3, such control systems may include MAU control system 301 and/or bot control system 303. The movements, repositioning, etc. of MAUs 107 may be performed based on instructions from bot control system 303, as discussed below. Additionally, bot control system 303 may communicate with one or more wireless bots 109 via network system 305, which may include one or more MAUs 107. Network system 305 may further include one or more routers, hubs, switches, gateways, network cables, or the like via which MAUs 107 may communicate with MAU control system 301, bot control system 303, and/or other devices or systems. For example, network system 305 may perform routing, network address translation, or other suitable operations in order to forward traffic, received from bot control system 303, to a suitable wireless bot 109 or UE 307 to which such traffic is addressed.

MAU control system 301 may determine positioning instructions, beamforming instructions, etc. for MAUs 107 based on locations of wireless bots 109 within environment 100, locations of MAUs 107, and/or locations of objects 111. In some embodiments, MAU control system 301 may identify the presence of objects 111 within environment 100 based on one or more models, such as one or more environment models generated by environment modeling system 309. As shown in FIG. 3, environment modeling system 309 may generate or refine such environment models based on RF metrics provided by one or more MAUs 107, wireless bots 109, UEs 307, and/or other devices or systems within environment 100. For example, as shown, one or more MAUs 107, and/or one or more other components of network system 305, may determine (at 302) RF metrics associated with communications between respective MAUs 107 and one or more wireless bots 109 and/or UEs 307. As discussed above, such metrics may include SINR, RSSI, RSRP, RSRQ, CQI, and/or other suitable RF metrics. Additionally, or alternatively, MAUs 107 may determine traffic metrics such as throughput, latency, jitter, or the like associated with communications between respective MAUs 107 and wireless bots 109 and/or UEs 307.

In some embodiments, wireless bots 109 and/or UEs 307 may determine RF metrics and/or traffic metrics associated with communications between respective wireless bots 109 and/or UEs 307, and one or more MAUs 107. For example, MAUs 107 may wirelessly broadcast or otherwise output presence information (e.g., preambles, Service Set Identifier ("SSID") information, timing information, System Information Blocks ("SIBs"), Master Information Blocks ("MIBs"), beacons, or other types of wireless signals that may be detected by wireless bots 109 and/or UEs 307. Wireless bots 109 and/or UEs 307 may, in some embodiments, determine measurement reports or other types of information indicating RF metrics, traffic metrics, etc. based on presence information detected from one or more MAUs 107.

In some embodiments, wireless bots 109, UEs 307, and/or some other device or system may determine location information associated with MAUs 107, wireless bots 109, and/or UEs 307 (e.g., locations within environment 100), such that RF metrics, traffic metrics, etc. that are determined with respect to particular MAUs 107, wireless bots 109, and/or UEs 307 are associated with particular locations within environment 100. Thus, such RF metrics, traffic metrics, etc. may describe wireless signal quality given a particular set of conditions (e.g., conditions relating to relative or absolute positions of MAUs 107 and wireless bots 109 or UEs 307 that are to communicate with or detect such MAUs 107).

MAU control system 301 may receive (at 304) RF metrics, traffic metrics, etc. associated with wireless communications between MAUs 107, and wireless bots 109 and/or UEs 307. For example, MAU control system 301 may communicate with MAUs 107 via an application programming interface ("API") or some other suitable communication interface. In some embodiments, wireless bots 109 and/or UEs 307 may further provide (at 304) measurement reports or other indications of RF and/or traffic metrics to MAU control system 301 via an API or other suitable communication interface. In some embodiments, wireless bots 109 and/or UEs 307 may provide such measurement reports or other indications of RF and/or traffic metrics to network system 305 (e.g., one or more MAUs 107), which may forward such information to MAU control system 301. In some embodiments, MAU control system 301 may further provide (at 306) such information to environment modeling system 309.

Environment modeling system 309 may generate and/or refine (at 308) an environment model associated with environment 100, based on the received (at 306) RF metrics and/or traffic metrics. For example, the environment model may indicate particular locations or regions within environment 100 where such metrics are relatively low (e.g., below a threshold level). Additionally, or alternatively, the environment model may include a "heat map" or other similar representation of RF metrics and/or traffic metrics at particular locations within environment 100. By virtue of receiving numerous RF metrics and/or traffic metrics under varying conditions (e.g., based on different locations of MAUs 107, wireless bots 109, and/or UEs 307) over time, the environment model may indicate the presence and/or attributes (e.g., size, shape, material, etc.) of objects 111 within environment 100. Specifically, for example, locations within environment 100 where MAUs 107, wireless bots 109, and/or UEs 307 determine relatively low measures of RF metrics and/or traffic metrics may be locations at which respective objects 111 are located. As another example, a relatively tall or short object 111 may be detected based on relative positions of MAUs 107, and wireless bots 109 and/or UEs 307. As yet another example, different materials may affect RF transmissions differently, which may be determined based on RF metrics and/or traffic metrics received (at 306) by environment modeling system 309.

In some embodiments, environment modeling system 309 may generate and/or refine (at 308) an environment model based on information in addition to, or in lieu of, RF and/or traffic metrics associated with MAUs 107, wireless bots 109, and/or UEs 307. For example, environment modeling system 309 may receive LIDAR information, visual information (e.g., as captured by one or more cameras), or other suitable information based on which environment modeling system 309 may identify respective locations and/or attributes of one or more objects 111 within environment 100.

In some embodiments, environment modeling system 309 may generate and/or modify (at 308) multiple environment models for environment 100 that are associated with different times, events, etc. For example, a configuration of objects 111 within environment 100 may change on a schedule (e.g., based on time of day, day of week, etc.), or in response to particular events.

Figure 4:
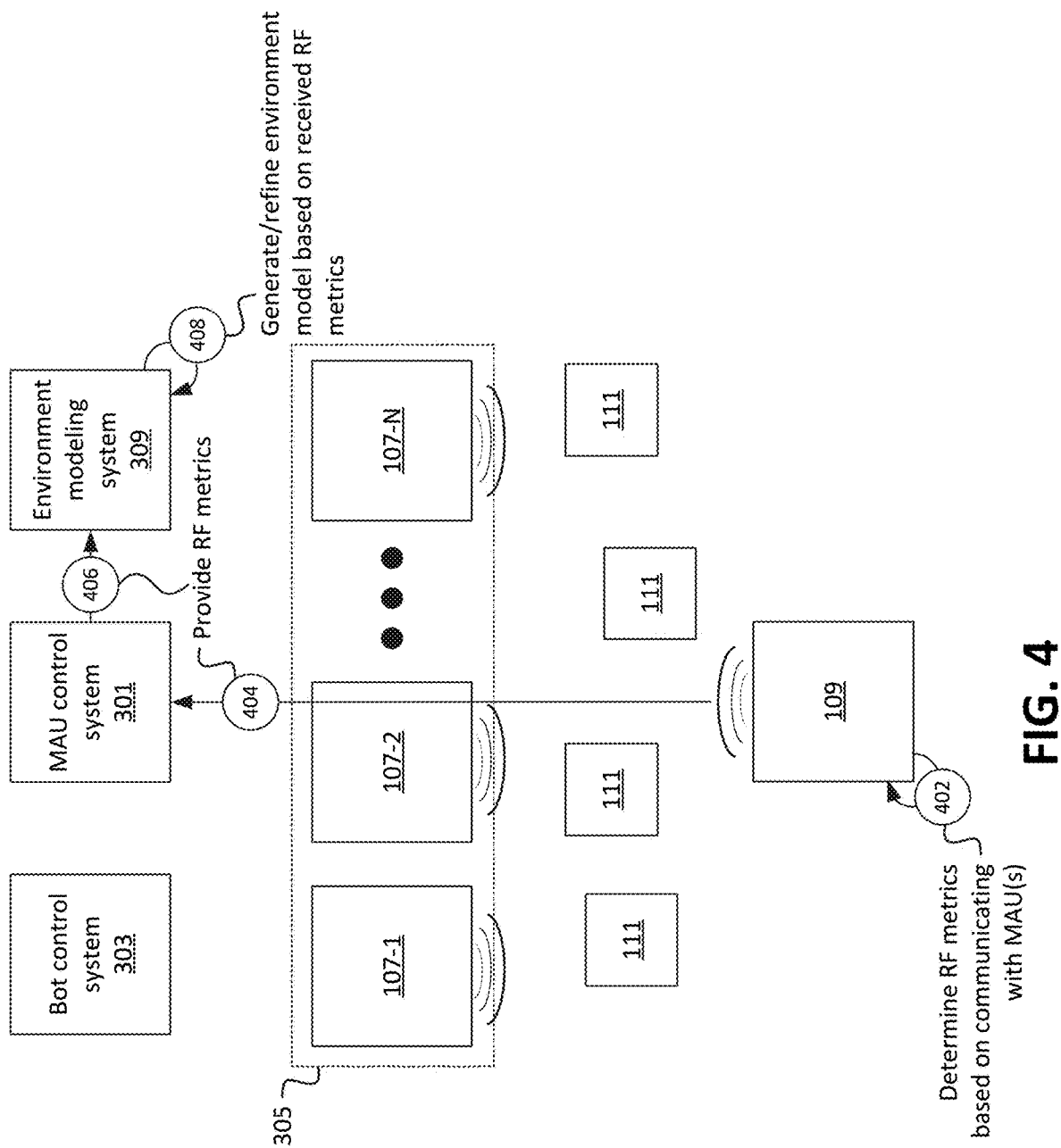

FIG. 4 illustrates an example of environment model generation based on RF metrics, traffic metrics, or other suitable metrics provided by wireless bot 109. For example, as similarly discussed above, wireless bot 109 may determine (at 402) RF metrics, traffic metrics, or other suitable metrics associated with communications with one or more MAUs 107. Wireless bot 109 may provide (at 404) such information to MAU control system 301 via a particular MAU 107 to which wireless bot 109 is connected (i.e., MAU 107-2, in this example). MAU control system 301 may forward (at 406) the RF metrics and/or traffic metrics (e.g., as determined by wireless bot 109) to environment modeling system 309, which may generate and/or refine (at 408) one or more environment models associated with environment 100 based on the received RF and/or traffic metrics, as similarly described above.

Figure 5:
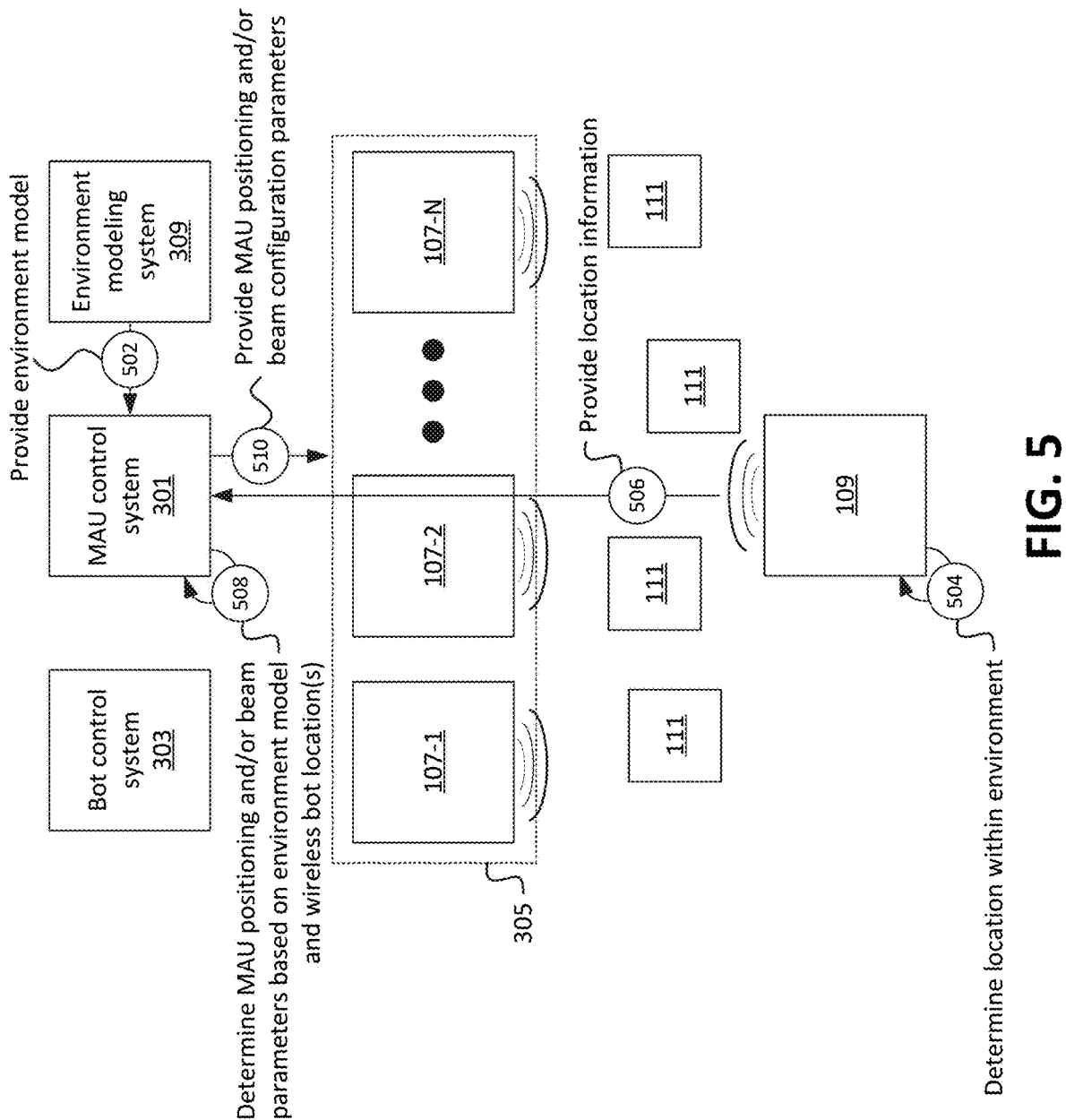
FIG. 5 illustrates an example modification of parameters of one or more Mobile Antenna Units ("MAUs") in order to improve wireless performance associated with the one or more MAUs, in accordance with some embodiments.

FIG. 5 illustrates an example configuration of parameters associated with one or more MAUs 107 in a given environment 100 based on location(s), positions, etc. of one or more objects 111 within environment 100 and/or one or more wireless bots 109 within environment 100. For example, MAU control system 301 may receive (at 502) one or more environment models from environment modeling system 309. As discussed above, environment modeling system 309 may generate or modify one or more environment models for environment 100, which may indicate locations, orientations, sizes, materials, and/or other attributes of one or more objects 111 located within environment 100. As noted above, such objects 111 may, in some situations, degrade wireless communications between one or more MAUs 107 and one or more wireless bots 109 within environment 100.

Wireless bots 109 within environment 100 may also determine (at 504) their own location within environment 100. For example, wireless bots 109 may utilize wireless triangulation, GPS location determination techniques, and/or other suitable techniques to determine a location of wireless bot 109 within environment 100. In some embodiments, environment 100 may include a set of fixed wireless beacons, based on which wireless bot 109 may determine its location. In some embodiments, one or more other devices or systems may detect locations of wireless bots 109 within environment 100. For example, environment 100 may include or may be communicatively coupled to a location determination system that identifies locations of wireless bots 109 within environment 100. In some embodiments, such location determination system may utilize wireless beacons, image recognition techniques (e.g., utilizing computer vision or other suitable techniques), and/or other suitable techniques to identify locations of wireless bots 109 within environment 100.

MAU control system 301 may receive (at 506) location information associated with one or more wireless bots 109 within environment 100. For example, in some embodiments, a particular wireless bot 109 may be communicatively coupled to a particular MAU 107 (e.g., MAU 107-2, in this example) within environment 100, and may communicate with MAU control system 301 via MAU 107. Additionally, or alternatively, wireless bot 109 may communicate with MAU control system 301 via some other network or communication pathway. In some embodiments, MAU control system 301 may receive location information regarding one or more wireless bots 109 within environment 100 from some other device or system. In some embodiments, as discussed above, MAU control system 301 may receive or determine predicted or scheduled location information for wireless bots 109, which may indicate times at which particular wireless bots 109 are predicted or scheduled to be at particular locations within environment 100. As further noted above, such predictions may be based on AI/ML techniques or other suitable analysis techniques based on historical location information associated with one or more wireless bots 109 within environment 100.

MAU control system 301 may further determine (at 508) configuration parameters for one or more MAUs 107 within environment 100 based on the environment model(s) (received at 502) and/or positioning information regarding wireless bots 109 (received at 506). For example, MAU control system 301 may determine positioning parameters (e.g., positioning on one or more tracks 103/105, positioning within three-dimensional space, etc.), directionality parameters (e.g., a direction in which one or more physical components should face), beamforming parameters (e.g., azimuth angle, beam width, and/or antenna gain associated with one or more antennas of MAU 107), or other parameters associated with one or more MAUs 107 of environment 100. MAU control system 301 may, for example, determine an "optimal" configuration for such parameters, where determining the "optimal" configuration may include generating one or more scores, modeling performance metrics, performing one or more simulations, making modifications in real time based on real-time performance metrics associated with wireless bots 109, or other suitable operations. In some embodiments, the "optimal" configuration may include minimizing or eliminating the degradation of wireless communications by objects 111 within environment 100. For example, MAU control system 301 may determine positions, angles, etc. for one or more MAUs 107 such that objects 111 are not within a line of sight between a particular MAU 107 and a particular wireless bot 109, and/or that a particular position, angle, beamforming configuration, etc. associated with MAU 107 minimizes or reduces the effects (e.g., wireless signal degradation) of one or more objects 111 in environment 100.

MAU control system 301 may further provide (at 510) the determined MAU configuration parameters to one or more MAUs 107. For example, MAU control system 301 may provide the determined MAU configuration parameters to network system 305, which may forward such parameters to one or more respective MAUs 107 to which such parameters apply. MAUs 107 may accordingly implement such parameters by moving (e.g., along one or more tracks 103/105, moving via a drone or other apparatus, etc.), actuating one or more motors or other mechanisms (e.g., to rotate one or more components of MAU 107), modifying beamforming parameters, etc. Based on the implementation of such configuration parameters, a particular MAU 107 may exhibit improved wireless communications with one or more wireless bots 109 within environment 100 (e.g., improved as compared to prior to the implementation of such parameters). Such improvement may be a result of wireless bot 109 becoming within wireless range of MAU 107. Additionally, or alternatively, such improvement may be the result of one or more objects 111, which were previously interfering with wireless communications between MAU 107 and wireless bot 109, no longer interfering with such wireless communications (e.g., based on the movement or other configuration changes of MAU 107).

Figure 6:
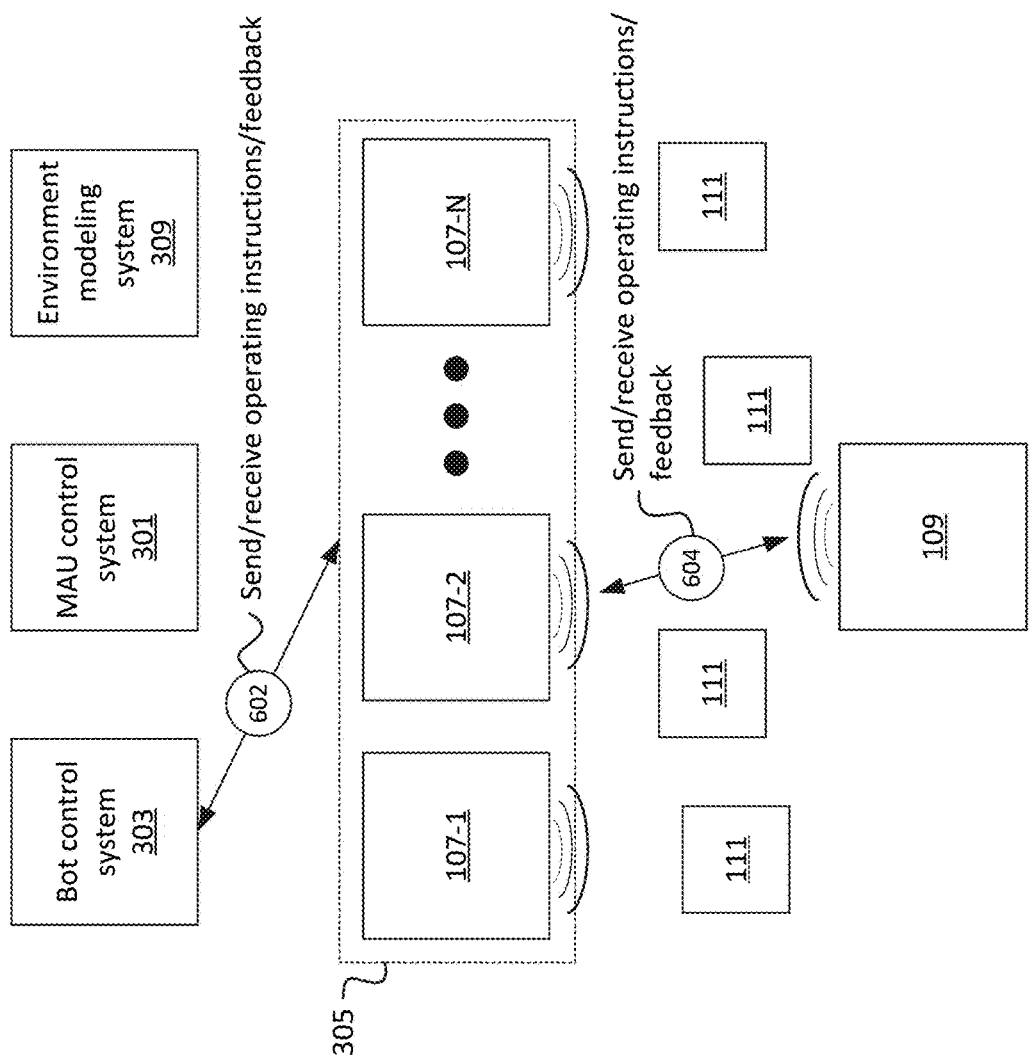
FIG. 6 illustrates an example communication between one or more wireless bots in a particular environment and a bot control system, in accordance with some embodiments.

Once wireless bot 109 is connected to a particular MAU 107 (e.g., which may be facilitated or made possible by the movement of the particular MAU 107 and/or one or more other MAUs 107), wireless bot 109 may send and/or receive operating instructions, feedback, and/or other information to and/or from bot control system 303 or some other device or system. For example, as shown in FIG. 6, wireless bot 109 may be wirelessly connected to a particular MAU 107 (i.e., MAU 107-2, in this example). Bot control system 303 may send (at 602) operating instructions to wireless bot 109 via network system 305 (e.g., via MAU 107-2), which may be received (at 604) by wireless bot 109. Such operating instructions may include instructions to move to a particular location within environment 100, instructions to actuate one or more physical components of wireless bot 109 (e.g., one or more wheels, motors, arms, treads, etc.) or other suitable operating instructions. Wireless bot 109 may further provide (at 604), via MAU 107-2, feedback information or other types of information, which may be received (at 602) by bot control system 303. Such feedback or other information may include sensor information collected by wireless bot 109, such as telematics data, visual data (e.g., as captured by one or more cameras of wireless bot 109), sensor data, or other suitable information. In some embodiments, feedback information may include measurement reports, RF metrics, or other information describing wireless communications or signal quality between wireless bot 109 and one or more MAUs 107, wireless bots 109, and/or other devices or systems within environment 100.

Figure 7A:
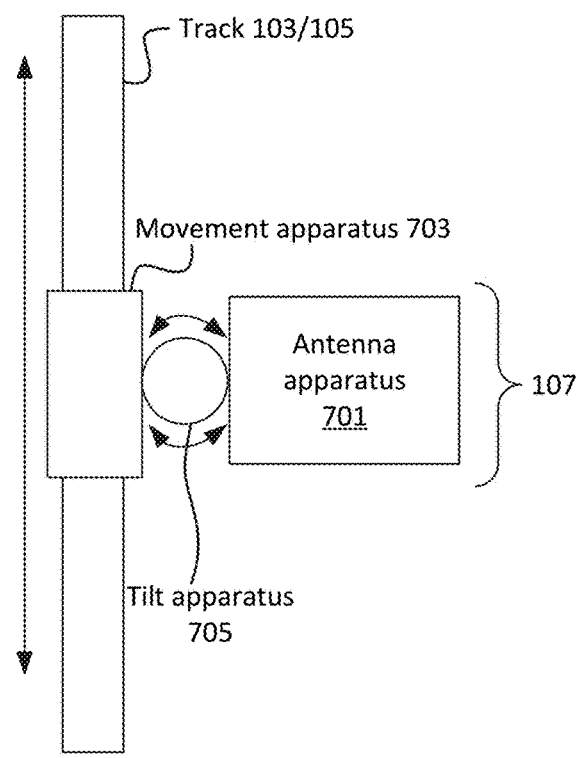
FIGS. 7A-7C illustrate example components of a particular MAU in accordance some embodiments.
Figure 7B:
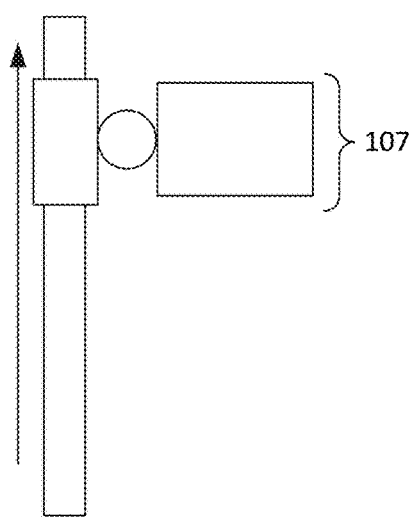
Figure 7C:
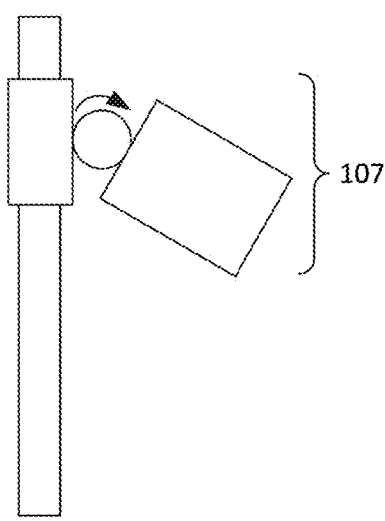

FIGS. 7A-7C illustrate example components of a particular MAU 107, in accordance with some embodiments. In some embodiments, MAU 107 may include additional, fewer, different, and/or differently arranged components. For example, the example MAU 107 of FIGS. 7A-7C is able to move along one or more tracks 103/105. In other examples, MAU 107 may able to move (e.g., in two-dimensional and/or three-dimensional space) using some other type of mobility mechanism or apparatus. Further, in some embodiments, MAU 107 may include or may be communicatively coupled to one or more cables, wires, looms, or other physical communication apparatus. Such physical communication apparatus may provide for or may facilitate communication between MAU 107 and MAU control system 301 and/or one or more other devices or systems.

As shown in FIG. 7A, for example, MAU 107 may include antenna apparatus 701, movement apparatus 703, and tilt apparatus 705. In some embodiments, MAU 107 may include additional components not explicitly described here, such as one or more processors, storage devices, memory (e.g., volatile and/or non-volatile memory), batteries or other power sources, motors, propellers, sensors, etc. Antenna apparatus 701 may include one or more antennas, radios, or the like via which MAU 107 may wirelessly communicate with wireless bots 109, UEs 307, and/or other devices or systems. In some embodiments, antenna apparatus 701 may include a Multiple-Input Multiple-Output ("MIMO") array of antennas. In some embodiments, antenna apparatus 701 may include one or more antennas, radios, etc. with configurable parameters, such as parameters indicating beam width, antenna gain, and/or beam directionality. As noted above, MAU 107 may receive configuration parameters (e.g., from MAU control system 301) to adjust such parameters associated with antenna apparatus 701, in order to minimize or eliminate the degradation of wireless signals associated with antenna apparatus 701 caused by the presence of one or more objects 111 within environment 100.

Movement apparatus 703 may include one or more wheels, pulleys, motors, etc. that may allow MAU 107 to move alone one or more tracks 103/105. For example, MAU 107 may receive operating instructions from bot control system 303 to move to a particular position within environment 100, and/or may otherwise receive instructions to move along one or more tracks 103/105. For example, as shown in FIG. 7B, MAU 107 may move from an initial position along track 103/105 to a different position along track 103/105 by actuating movement apparatus 703.

Tilt apparatus 705 may include one or more wheels, hinges, ball bearings, or other suitable components that may allow antenna apparatus 701 to rotate, spin, or otherwise adjust angularity. For example, as shown in FIG. 7C, one or more portions of MAU 107 may rotate (e.g., modified yaw, pitch, and/or roll) about one or more axes by way of actuation of tilt apparatus 705.

As noted above, in some embodiments, MAU 107 and/or MAU control system 301 may implement one or more APIs or other suitable communication pathways, via which MAU control system 301 may provide instructions to MAU 107 in order to cause MAU 107 to move within environment 100, configure antenna parameters (e.g., associated with antenna apparatus 701 and/or tilt apparatus 705), and/or perform other actions. In some embodiments, the API may include a RESTful API or some other suitable API. In some embodiments, the MAU 107 may execute a client application associated with the API, which executes actions as instructed by MAU control system 301. Example actions and/or API features are described below.

The API may include a movement/orientation action instruction. The movement/orientation action instruction may include a parameter indicating an identifier of a particular MAU 107. The movement/orientation action instruction may include a position parameter, which may specify one or more particular tracks 103/105 to which the particular MAU 107 should move, and/or a position on such track(s) 103/105 to which the particular MAU 107 should move. The movement/orientation action instruction may include an azimuth parameter, which may specify an orientation, angle, etc. of antenna apparatus 701 and/or tilt apparatus 705. The movement/orientation action instruction may be or may include a JavaScript Object Notation ("JSON") object, which may include one or more of the parameters used in the instruction. In some embodiments, the movement/orientation action instruction may be or may include a Hypertext Transfer Protocol ("HTTP") message, such as an HTTP POST message that includes one or more of the above parameters in a payload of the message.

The API may specify one or more responses to the movement/orientation action instruction, which may be provided by MAU 107 to MAU control system 301 in response to receiving a particular movement/orientation. A first response may include an acknowledgment response, such as a "200 OK" response. The first response may be or may include a JSON object. In some embodiments, the response may include a callback identifier that allows for requesting the status of the action. In some embodiments, a second response may include an error response, such as a "400 Bad Request" response, indicating that the movement/orientation action instruction could not be implemented by MAU 107 for some reason, such as a malformed request, improper MAU identifier, etc.

In some embodiments, the API may include a path traversal action instruction. The path traversal action instruction may include a parameter indicating an identifier of a particular MAU 107. The path traversal action instruction may include a set of positions to be traversed by the particular MAU 107, such as positions along one or more tracks 103/105. Each position, indicated in the set of positions, may be associated with a time parameter. In some embodiments, the time parameter may indicate an amount of time over which the MAU 107 should move from a current position to the indicated position. In other embodiments, the time parameter may indicate a time by which MAU 107 should be moved to the position. Each position, indicated in the set of positions, may further be associated with an azimuth parameter, which may specify an orientation, angle, etc. of antenna apparatus 701 and/or tilt apparatus 705 to be implemented by the particular MAU 107 while traversing from its current position to the indicated position. In some embodiments, the path traversal action instruction may be or may include a JSON object, which may include one or more of the parameters of the instruction. In some embodiments, the path traversal action instruction may be or may include a HTTP message, such as an HTTP POST message that includes one or more of the above parameters in a payload of the message.

The API may specify one or more responses to the path traversal action instruction, which may be provided by MAU 107 to MAU control system 301 in response to receiving a particular path traversal action instruction. A first response may include an acknowledgment response, such as a "200 OK" response. The first response may be or may include a JSON object. In some embodiments, the response may include a callback identifier that allows for requesting the status of the action. In some embodiments, a second response may include an error response, such as a "400 Bad Request" response, indicating that the path traversal action instruction could not be implemented by MAU 107 for some reason, such as a malformed request, improper MAU identifier, etc.

The API may include a "Get Status" instruction. The Get Status instruction may include a parameter indicating a callback identifier associated with a previous action (e.g., a movement/orientation action instruction, a path traversal action instruction, and/or some other instruction) issued through the API. The Get Status instruction may be or may include a JSON object, which may include one or more of the parameters used in the instruction. In some embodiments, the Get Status instruction may be or may include an HTTP message, such as an HTTP GET message that includes one or more of the above parameters in a payload of the message.

The API may specify one or more responses to the get status instruction, which may be provided by MAU 107 to MAU control system 301 in response to receiving a get status instruction. A first response may include an acknowledgment response, such as a "200 OK" response. The first response may be or may include a JSON object. In some embodiments, the response may include status information associated with the instruction associated with the callback identifier. Such status information may include information such as "COMPLETED", "PENDING", "FAILED," or other tokens associated with action status. In some embodiments, a second response may include an error response, such as a "400 Bad Request" response, indicating, for example, that the callback identifier is unknown.

Figure 8:
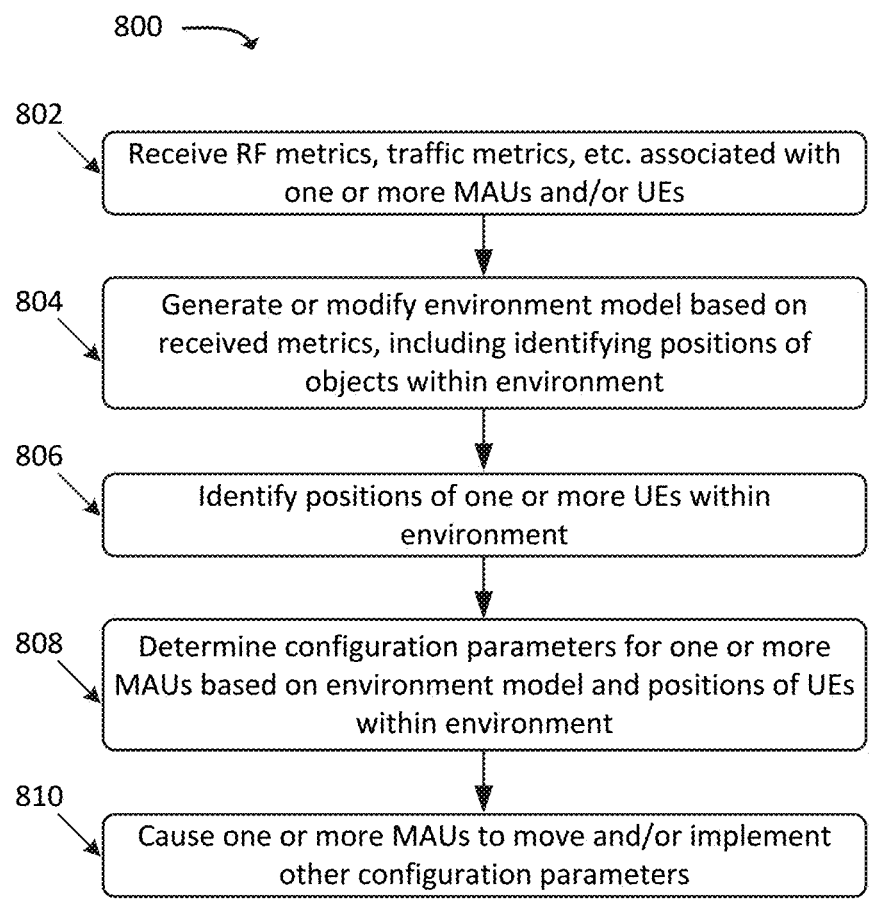
FIG. 8 illustrates an example process for adjusting configuration parameters of one or more MAUs based on modeling an environment and detecting objects within the environment, in accordance with some embodiments.

FIG. 8 illustrates an example process 800 for adjusting configuration parameters of one or more MAUs 107 (e.g., associated with a particular environment 100) based on modeling environment 100 and detecting objects 111 within environment 100. In some embodiments, some or all of process 800 may be performed by MAU control system 301.

In some embodiments, one or more other devices may perform some or all of process 800 (e.g., in concert with, and/or in lieu of, MAU control system 301), such as bot control system 303, environment modeling system 309, and/or one or more devices or systems.

As shown, process 800 may include receiving (at 802) RF metrics, traffic metrics, and/or other information associated with environment 100. For example, as discussed above, MAU control system 301 may receive such metrics from MAUs 107, UEs 307, a ranging device that uses LIDAR or other suitable proximity detection techniques, and/or one or more other devices or systems over time. As discussed above, UEs 307 may include, may be implemented by, and/or may be communicatively coupled to one or more wireless bots 109. Thus, while process 800 is described in the context of UEs 307, the same or similar concepts may apply for wireless bots 109 within environment 100. As discussed above, environment 100 may be or may be situated within a room or other type of space, a facility, a data center, a warehouse, etc.

Process 800 may further include generating and/or modifying (at 804) one or more environment models associated with environment 100. For example, MAU control system 301, environment modeling system 309, and/or some other device or system may identify locations, positions, quadrants, or other portions of environment 100 at which RF metrics, traffic metrics, or other metrics associated with wireless communications associated with MAUs 107 of environment 100 are (or are predicted to be) relatively low. For example, such metrics may be "low" when some or all of the metrics (and/or values derived thereof) are below a threshold level, which may indicate the presence of one or more objects 111 at such locations within environment 100. Additionally, or alternatively, such metrics may be considered as "low" in a comparative sense, such as areas with values for RF metrics, traffic metrics, etc. that are lower than the same metrics in other locations or regions of environment 100.

Process 800 may additionally include identifying (at 806) positions of one or more UEs 307 within environment 100. For example, MAU control system 301 may receive location and/or positioning information from UEs 307 (e.g., via an API, via one or more MAUs 107, and/or via some other suitable communication pathway), which may detect their own position using GPS techniques or other suitable techniques. Additionally, or alternatively, MAUs 107, network system 305, MAU control system 301, and/or one or more other devices or systems may identify locations of UEs 307 within environment 100 using image recognition techniques, wireless beacons, wireless triangulation, or other suitable techniques. In some embodiments, MAU control system 301 may receive or generate one or more models indicating predicted or actual positions of one or more UEs 307 within environment 100 at particular times or time periods (such as planned path of travel).

Process 800 may also include determining (at 808) configuration parameters for one or more MAUs 107 based on the environment model associated with environment 100 and further based on positions of UEs 307 within environment 100. For example, as discussed above, MAU control system 301 may determine positioning parameters for one or more MAUs 107 such that wireless communications between such MAUs 107 and one or more UEs 307 are not interfered with by objects 111, and/or that the effects of such interference are minimized. For example, the positioning parameters may include moving a particular MAU 107 from a first position, in which one or more objects 111 are within a line of sight between MAU 107 and UE 307, to a second position such that the one or more objects 111 are not within the line of sight between MAU 107 and UE 307. As discussed above, MAU 107 may be mobile in three-dimensional space, such as mounted to one or more tracks 103/105, a drone, or other type of movement apparatus. In some embodiments, the configuration parameters may additionally, or alternatively include beamforming parameters, tilt parameters, or other suitable parameters.

In some embodiments, as discussed above, MAU control system 301 may determine that adjustment of parameters of a second MAU 107 should be performed based on the adjustment of parameters associated with a first MAU 107 (e.g., where the first MAU 107 is adjusted based on the presence of one or more objects 111 and one or more UEs 307). For example, MAU control system 301 may determine that the first and second MAUs 107 should be at least a threshold distance apart, that coverage areas associated with the first and second MAUs 107 should only overlap by a certain amount, that coverage areas associated with the first and second MAUs 107 should not overlap, and/or may otherwise determine that the modification of parameters associated with the second MAU 107 should be made based on the modification of parameters associated with the first MAU 107.

Process 800 may further include causing (at 810) the one or more MAUs 107 to move and/or otherwise implement the configuration parameters. For example, MAU control system 301 may issue a command, instruction, etc. to MAUs 107 and/or to network system 305 (e.g., which may forward such command, instruction, etc. to MAUs 107). MAUs 107 may accordingly move (e.g., using movement apparatus 703) to a position indicated in the configuration parameters, actuate one or more tilt mechanisms (e.g., tilt apparatus 705), modify beamforming parameters associated with antenna apparatus 701 of MAU 107, and/or otherwise perform one or more operations based on the provided configuration parameters. In this manner, UEs such as UEs 307, wireless bots 109, etc. that receive wireless service from MAU 107 may receive wireless service with at least a threshold level of performance or quality.

Figure 9:
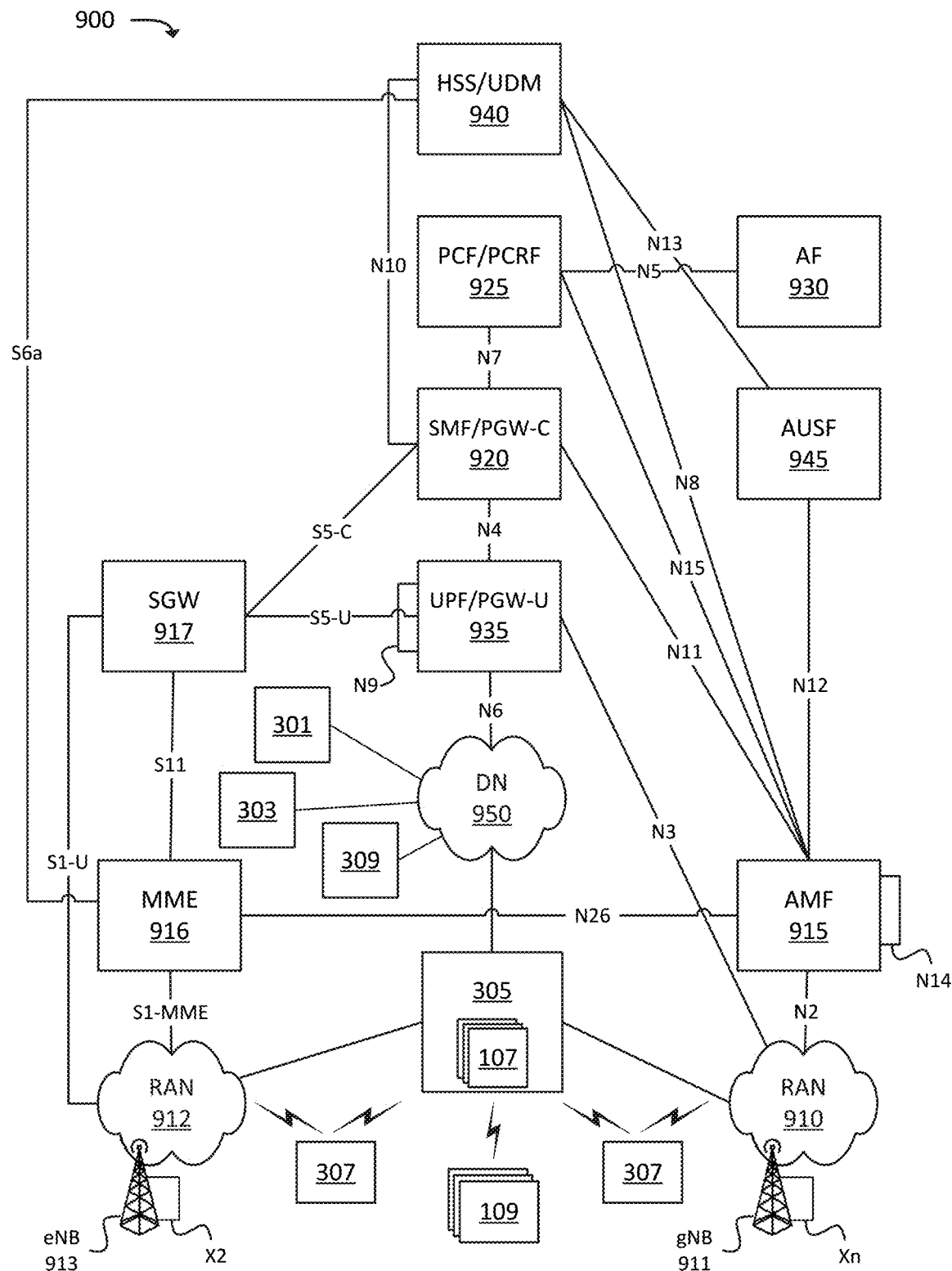
FIG. 9 illustrates an example environment in which one or more embodiments, described herein, may be implemented.

FIG. 9 illustrates an example network environment 900, in which one or more embodiments may be implemented. In some embodiments, network environment 900 may correspond to a Fifth Generation ("5G") network, and/or may include elements of a 5G network. In some embodiments, network environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, network environment 900 may include UE 307, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MIME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Network environment 900 may also include one or more networks, such as Data Network ("DN") 950. Network environment 900 may include one or more additional devices or systems communicatively coupled to one or more networks (e.g., DN 950), such as one or more MAUs 107 and/or wireless bots 109, MAU control system 301, bot control system 303, network system 305, and/or environment modeling system 309, which may perform one or more operations described above.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, network environment 900 may include multiple instances of such components or functions. For example, in some embodiments, network environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, network environment 900 may include additional devices and/or networks, fewer devices and/or networks, different devices and/or networks, or differently arranged devices and/or networks than illustrated in FIG. 9. For example, while not shown, network environment 900 may include devices that facilitate or enable communication between various components shown in network environment 900, such as routers, modems, gateways, switches, hubs, etc. Alternatively, or additionally, one or more of the devices of network environment 900 may perform one or more network functions described as being performed by another one or more of the devices of network environment 900. Devices of network environment 900 may interconnect with each other and/or other devices via wired connections, wireless connections, or a combination of wired and wireless connections. In some implementations, one or more devices of network environment 900 may be physically integrated in, and/or may be physically attached to, one or more other devices of network environment 900.

UE 307 may include a computation and communication device, such as a wireless mobile communication device that is capable of communicating with RAN 910, RAN 912, and/or DN 950. UE 307 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 307 may send traffic to and/or receive traffic (e.g., user plane traffic) from DN 950 via RAN 910, RAN 912, and/or UPF/PGW-U 935. As noted above, in some embodiments, UE 307 may be, or may be included in, a wireless bot 109.

RAN 910 may be, or may include, a 5G RAN that includes one or more base stations (e.g., one or more gNBs 911), via which UE 307 may communicate with one or more other elements of network environment 900. UE 307 may communicate with RAN 910 via an air interface (e.g., as provided by gNB 911). For instance, RAN 910 may receive traffic (e.g., voice call traffic, data traffic, messaging traffic, signaling traffic, etc.) from UE 307 via the air interface, and may communicate the traffic to UPF/PGW-U 935, and/or one or more other devices or networks. Similarly, RAN 910 may receive traffic intended for UE 307 (e.g., from UPF/PGW-U 935, AMF 915, and/or one or more other devices or networks) and may communicate the traffic to UE 307 via the air interface.

RAN 912 may be, or may include, a LTE RAN that includes one or more base stations (e.g., one or more eNBs 913), via which UE 307 may communicate with one or more other elements of network environment 900. UE 307 may communicate with RAN 912 via an air interface (e.g., as provided by eNB 913). For instance, RAN 910 may receive traffic (e.g., voice call traffic, data traffic, messaging traffic, signaling traffic, etc.) from UE 307 via the air interface, and may communicate the traffic to UPF/PGW-U 935, and/or one or more other devices or networks. Similarly, RAN 910 may receive traffic intended for UE 307 (e.g., from UPF/PGW-U 935, SGW 917, and/or one or more other devices or networks) and may communicate the traffic to UE 307 via the air interface.

AMF 915 may include one or more devices, systems, Virtualized Network Functions ("VNFs"), etc., that perform operations to register UE 307 with the 5G network, to establish bearer channels associated with a session with UE 307, to hand off UE 307 from the 5G network to another network, to hand off UE 307 from the other network to the 5G network, manage mobility of UE 307 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 307 with the EPC, to establish bearer channels associated with a session with UE 307, to hand off UE 307 from the EPC to another network, to hand off UE 307 from another network to the EPC, manage mobility of UE 307 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate the establishment of communication sessions on behalf of UE 307. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 307, from DN 950, and may forward the user plane data toward UE 307 (e.g., via RAN 910, SMF/PGW-C 920, and/or one or more other devices). In some embodiments, multiple UPFs 935 may be deployed (e.g., in different geographical locations), and the delivery of content to UE 307 may be coordinated via the N9 interface (e.g., as denoted in FIG. 9 by the line marked "N9" originating and terminating at UPF/PGW-U 935). Similarly, UPF/PGW-U 935 may receive traffic from UE 307 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 307.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 307 may communicate, through DN 950, with data servers, other UEs 307, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as MAU control system 301, bot control system 303, network system 305, content providers, applications, web servers, and/or other devices, with which wireless bot 109 and UE 307 may communicate, and/or via which such devices or systems may communicate with each other. In some embodiments, while shown as being communicatively coupled to DN 950, one or more of MAU control system 301, bot control system 303, network system 305, and/or environment modeling system 309 may be implemented by the same device or system, and/or may communicate via some other network or communication pathway.

Figure 10:
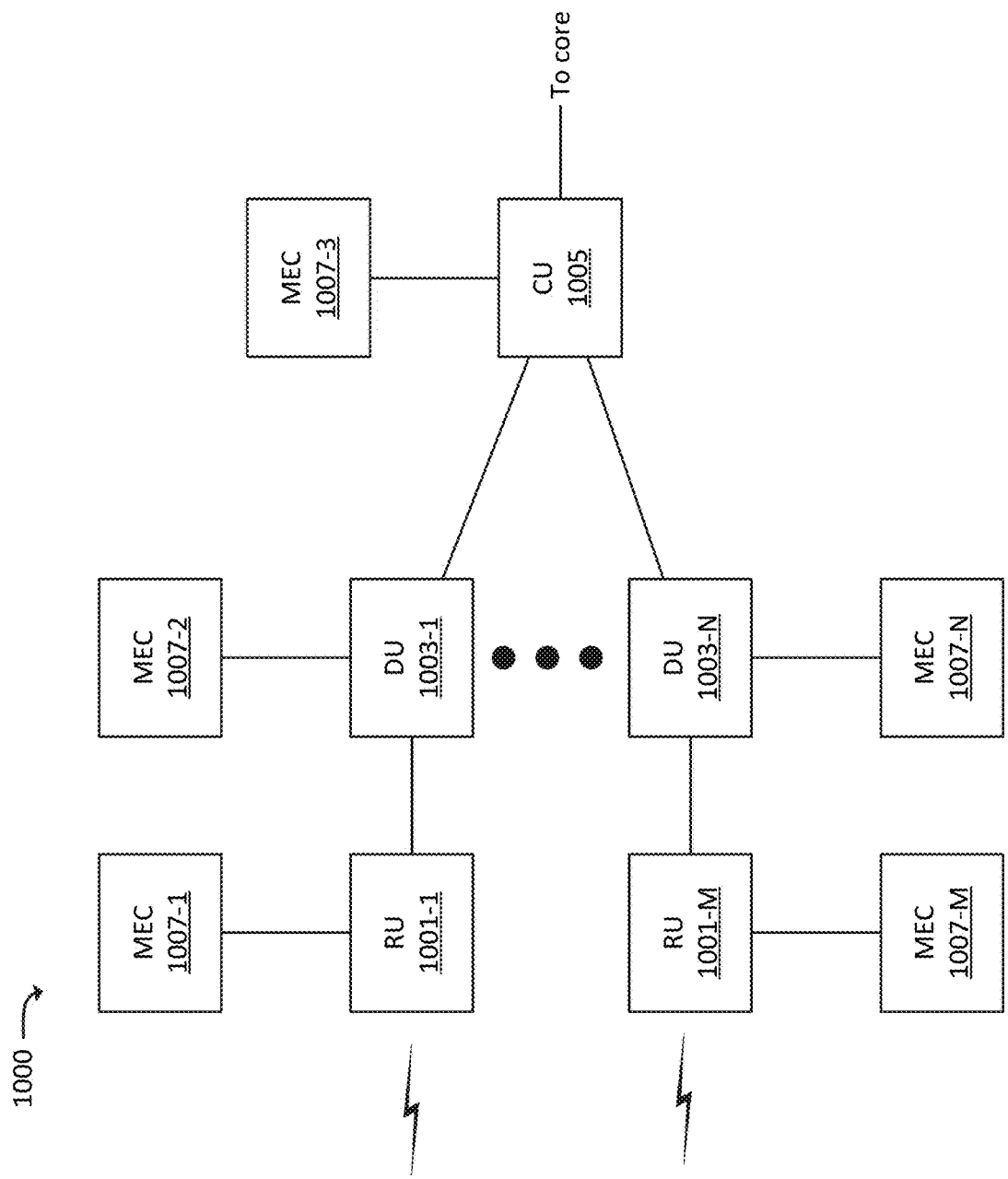
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 307 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 307, and may determine which DU(s) 1003 should receive the downlink traffic. DU 1003 may include one or more devices that transmit traffic between a core network (e.g., via CU 1005) and UE 307 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 307.

RU 1001 may include hardware circuitry (e.g., one or more RF transceivers, antennas, radios, and/or other suitable hardware) to communicate wirelessly (e.g., via an RF interface) with one or more UEs 307, one or more other DUs 1003 (e.g., via RUs 1001 associated with DUs 1003), and/or any other suitable type of device. In the uplink direction, RU 1001 may receive traffic from UE 307 and/or another DU 1003 via the RF interface and may provide the traffic to DU 1003. In the downlink direction, RU 1001 may receive traffic from DU 1003, and may provide the traffic to UE 307 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 307, via a respective RU 1001.

For example, RU 1001-1 may route some traffic, from UE 307, to MEC 1007-1 instead of to a core network (e.g., via DU 1003 and CU 1005). MEC 1007-1 may process the traffic, perform one or more computations based on the received traffic, and may provide traffic to UE 307 via RU 1001-1. In this manner, ultra-low latency services may be provided to UE 307, as traffic does not need to traverse DU 1003, CU 1005, and an intervening backhaul network between DU network 1000 and the core network. In some embodiments, MEC 1007 may include, and/or may implement, some or all of the functionality described above with respect to MAU control system 301, bot control system 303, and/or environment modeling system 309.

Figure 11:
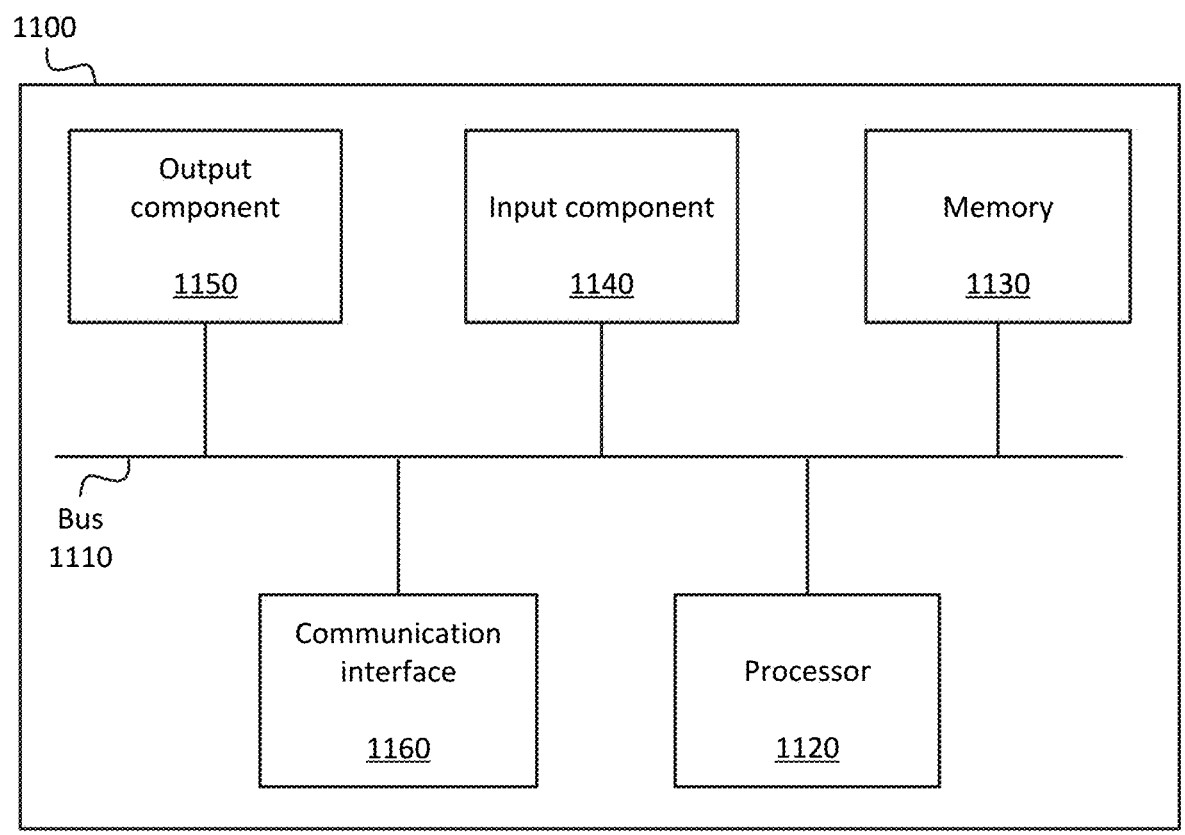
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a GPS-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
generate or modify one or more models indicating respective positions of one or more objects within a particular environment;
identify a position of a User Equipment ("UE") within the particular environment;
determine configuration parameters for one or more antenna apparatuses based on a position of at least one object, of the one or more objects, within the particular environment and further based on the position of the UE within the particular environment, wherein the configuration parameters include:
a particular position within the environment at which a particular antenna apparatus, of the one or more antenna apparatuses, should be located, and
beamforming parameters that include at least one of:
a beam width of one or more wireless beams associated with the particular antenna apparatus,
an angle of the one or more wireless beams associated with the particular antenna apparatus, or
an antenna gain associated with the particular antenna apparatus; and
cause the one or more antenna apparatuses to implement the determined configuration parameters, including causing the particular antenna apparatus to move to the particular position within the environment.

2. The device of claim 1, wherein the particular position is a first position within the environment, wherein the particular antenna apparatus is located at a different second position prior to moving to the first position.

3. The device of claim 1, wherein the particular antenna apparatus is mounted to a track within the environment, wherein moving to the particular position within the environment includes moving along the track.

4. The device of claim 1, wherein generating or modifying the one or more models includes:
receiving radio frequency ("RF") metrics associated with the one or more antenna apparatuses and one or more UEs that are within communication range of the one or more antenna apparatuses;
detecting, based on the received RF metrics, locations within the environment that are associated with RF metrics that are below one or more thresholds; and
identifying the detected locations, that are associated with RF metrics that are below the one or more thresholds, as the positions of the one or more objects within the environment.

5. A device, comprising:
one or more processors configured to:
generate or modify one or more models indicating respective positions of one or more objects within a particular environment;
identify a position of a User Equipment ("UE") within the particular environment;
determine a first set of configuration parameters for a first set of antenna apparatuses based on a position of at least one object, of the one or more objects, within the particular environment and further based on the position of the UE within the particular environment, wherein the first set of configuration parameters include a particular position within the environment at which a particular antenna apparatus, of the first set of antenna apparatuses, should be located;
cause the first set of antenna apparatuses to implement the determined configuration parameters, including causing the particular antenna apparatus to move to the particular position within the environment;
determine a second set of configuration parameters for a second set of antenna apparatuses associated with the environment based on the first set of configuration parameters for the first set of antenna apparatuses; and
cause the second set of antenna apparatuses to implement the determined second set of configuration parameters.

6. The device of claim 5, wherein determining the second set of configuration parameters includes determining that the first set of configuration parameters includes moving a first antenna apparatus, of the first set of antenna apparatuses, to within a threshold proximity of a second antenna apparatus of the second set of antenna apparatuses.

7. The device of claim 5, wherein the particular antenna apparatus is mounted to a track within the environment, wherein moving to the particular position within the environment includes moving along the track.

8. A non-transitory computer-readable medium, storing a plurality of processor-executable instructions to:
generate or modify one or more models indicating respective positions of one or more objects within a particular environment;
identify a position of a User Equipment ("UE") within the particular environment;
determine configuration parameters for one or more antenna apparatuses based on a position of at least one object, of the one or more objects, within the particular environment and further based on the position of the UE within the particular environment, wherein the configuration parameters include:
a particular position within the environment at which a particular antenna apparatus, of the one or more antenna apparatuses, should be located, and
beamforming parameters that include at least one of:
a beam width of one or more wireless beams associated with the particular antenna apparatus,
an angle of the one or more wireless beams associated with the particular antenna apparatus, or
an antenna gain associated with the particular antenna apparatus; and
cause the one or more antenna apparatuses to implement the determined configuration parameters, including causing the particular antenna apparatus to move to the particular position within the environment.

9. The non-transitory computer-readable medium of claim 8, wherein the particular position is a first position within the environment, wherein the particular antenna apparatus is located at a different second position prior to moving to the first position.

10. The non-transitory computer-readable medium of claim 8, wherein the particular antenna apparatus is mounted to a track within the environment, wherein moving to the particular position within the environment includes moving along the track.

11. The non-transitory computer-readable medium of claim 8, wherein generating or modifying the one or more models includes:
receiving radio frequency ("RF") metrics associated with the one or more antenna apparatuses and one or more UEs that are within communication range of the one or more antenna apparatuses;
detecting, based on the received RF metrics, locations within the environment that are associated with RF metrics that are below one or more thresholds; and
identifying the detected locations, that are associated with RF metrics that are below the one or more thresholds, as the positions of the one or more objects within the environment.

12. A computer-readable medium, storing a plurality of processor-executable instructions to:
generate or modify one or more models indicating respective positions of one or more objects within a particular environment;
identify a position of a User Equipment ("UE") within the particular environment;
determine a first set of configuration parameters for a first set of antenna apparatuses based on a position of at least one object, of the one or more objects, within the particular environment and further based on the position of the UE within the particular environment, wherein the first set of configuration parameters include a particular position within the environment at which a particular antenna apparatus, of the first set of antenna apparatuses, should be located;
cause the first set of antenna apparatuses to implement the determined configuration parameters, including causing the particular antenna apparatus to move to the particular position within the environment;
determine a second set of configuration parameters for a second set of antenna apparatuses associated with the environment based on the first set of configuration parameters for the first set of antenna apparatuses; and
cause the second set of antenna apparatuses to implement the determined second set of configuration parameters.

13. The non-transitory computer-readable medium of claim 12, wherein determining the second set of configuration parameters includes determining that the first set of configuration parameters includes moving a first antenna apparatus, of the first set of antenna apparatuses, to within a threshold proximity of a second antenna apparatus of the second set of antenna apparatuses.

14. A method, comprising:
generating or modifying one or more models indicating respective positions of one or more objects within a particular environment;
identifying a position of a User Equipment ("UE") within the particular environment;
determining configuration parameters for one or more antenna apparatuses based on a position of at least one object, of the one or more objects, within the particular environment and further based on the position of the UE within the particular environment, wherein the configuration parameters include beamforming parameters that include:
a particular position within the environment at which a particular antenna apparatus, of the one or more antenna apparatuses, should be located, and
beamforming parameters that include at least one of:
a beam width of one or more wireless beams associated with the particular antenna apparatus,
an angle of the one or more wireless beams associated with the particular antenna apparatus, or
an antenna gain associated with the particular antenna apparatus; and
causing the one or more antenna apparatuses to implement the determined configuration parameters, including causing the particular antenna apparatus to move to the particular position within the environment.

15. The method of claim 14, wherein the particular position is a first position within the environment, wherein the particular antenna apparatus is located at a different second position prior to moving to the first position.

16. The method of claim 14, wherein the particular antenna apparatus is mounted to a track within the environment, wherein moving to the particular position within the environment includes moving along the track.

17. The method of claim 14, wherein generating or modifying the one or more models includes:
receiving radio frequency ("RF") metrics associated with the one or more antenna apparatuses and one or more UEs that are within communication range of the one or more antenna apparatuses;
detecting, based on the received RF metrics, locations within the environment that are associated with RF metrics that are below one or more thresholds; and
identifying the detected locations, that are associated with RF metrics that are below the one or more thresholds, as the positions of the one or more objects within the environment.

18. A method, comprising:
generating or modifying one or more models indicating respective positions of one or more objects within a particular environment;
identifying a position of a User Equipment ("UE") within the particular environment;
determining a first set of configuration parameters for a first set of antenna apparatuses based on a position of at least one object, of the one or more objects, within the particular environment and further based on the position of the UE within the particular environment, wherein the first set of configuration parameters include a particular position within the environment at which a particular antenna apparatus, of the first set of antenna apparatuses, should be located;
causing the first set of antenna apparatuses to implement the determined configuration parameters, including causing the particular antenna apparatus to move to the particular position within the environment;
determining a second set of configuration parameters for a second set of antenna apparatuses associated with the environment based on the first set of configuration parameters for the first set of antenna apparatuses; and
causing the second set of antenna apparatuses to implement the determined second set of configuration parameters.

19. The method of claim 18, wherein determining the second set of configuration parameters includes determining that the first set of configuration parameters includes moving a first antenna apparatus, of the first set of antenna apparatuses, to within a threshold proximity of a second antenna apparatus of the second set of antenna apparatuses.

20. The method of claim 18, wherein the particular antenna apparatus is mounted to a track within the environment, wherein moving to the particular position within the environment includes moving along the track.

\* \* \* \* \*